United States Patent [19]

Ostholt et al.

[11] Patent Number: 4,882,810
[45] Date of Patent: Nov. 28, 1989

[54] APPARATUS FOR REMOVING MEAT FROM A BONE OF A POULTRY LIMB OR THE LIKE

[75] Inventors: Rüdiger Ostholt, Wetter; Jörg Wahrmann, Sprockhövel; Klaus Becker, Wetter, all of Fed. Rep. of Germany

[73] Assignee: Lohmann Anlagenbau GmbH, Fed. Rep. of Germany

[21] Appl. No.: 280,105

[22] Filed: Dec. 5, 1988

[30] Foreign Application Priority Data

Dec. 4, 1987 [DE] Fed. Rep. of Germany ....... 3741121
Nov. 11, 1988 [DE] Fed. Rep. of Germany ....... 3838236

[51] Int. Cl.⁴ .............................................. A22C 17/04
[52] U.S. Cl. .......................................... 17/11; 17/1 G; 17/46
[58] Field of Search ...................... 17/46, 1 G, 11, 52

[56] References Cited

U.S. PATENT DOCUMENTS

| 4,216,565 | 8/1980 | Volk et al. | 17/1 G |
| 4,327,463 | 5/1982 | Martin | 17/1 G |
| 4,380,849 | 4/1983 | Adkison et al. | 17/1 G |
| 4,495,675 | 1/1985 | Hill, deceased et al. | 17/46 |
| 4,639,974 | 2/1987 | Olson | 17/46 |
| 4,811,457 | 3/1989 | Lindert | 17/46 |

Primary Examiner—Willis Little
Attorney, Agent, or Firm—Kinney & Lange

[57] ABSTRACT

An apparatus for deboning of poultry limbs or the like including at least one deboning unit which includes retaining means for the limbs, a stripping diaphragm and abutment means which by the bone is pushed out of the fillet, driving means moving the stripping diaphragm and the abutment relatively to each other with the stripping diaphragm being movably supported to limited extents in the diaphragm plane, the diaphragm including a movably supported driven diaphragm portion in order to open the diaphragm and to change the cross section of the diaphragm opening.

24 Claims, 12 Drawing Sheets

APPARATUS FOR REMOVING MEAT FROM A BONE OF A POULTRY LIMB OR THE LIKE

The invention refers to an apparatus for removing meat from a bone of a poultry limb or the like according to the preamble of claim 1.

An apparatus for removing meat from poultry limbs is known wherein matrixes or molds are located within a rotating drum, the limbs being manually placed therein. By means of a ram element, the bone is squeezed out of the fillet transverse to its longitudinal direction. It is of disadvantage that a detoriated fillet is obtained, the patella thereof still being connected to the fillet. Therefore, the patella has to be removed in a separate operation step.

It is further of disdadvantage that a relatively large mass of fillet remains at the bone rejected.

It has already become known to move a bone longitudinally through a rigid diaphragm by a pneumatic cylinder. Also with this method the patella remains at the fillet and has to be removed thereafter. The aperture of the diaphragm has a predetermined width and thus cannot be adapted to different bone diameters. Therefore also relatively much meat remains at the rejected bone.

In contrast to the manual removal of the bone which leads to clean deboned fillet pieces, however, requires a relatively high personal expense, the automatic removal with the known machines has an unsatisfactory result and a small gain. Therefore, it is the object of the invention to provide for an apparatus for automatically removing meat from a bone of a poultry limb or the like by which undetoriated filets can be obtained which are free from bone remainders and from the patella and by which only a small non-usable meat remainder is left at the bone.

This object is attained by an apparatus having the features of the characterizing portion of claim 1.

The apparatus according to the invention includes a stripping diaphragm which is movable in the plane of the diaphragm to a limited amount. By this it is considered that the bone of an upper or lower leg of poultry is not completely straight, rather curved, preferably in one plane. A rigid or fixed diaphragm, thus, cannot be adapted to the diameter of the bone which diameter may also be changed, but has to consider the curvature of the bone. By this relatively much residual meat remains at the bone when the fillet is stripped off. With the apparatus according to the invention, the diaphragm can follow the bone more or less in that it is at least floatingly supported in one plane. The diaphragm aperture can be dimensioned such that it is slightly larger than the maximum thickness of the bone shank.

It is further essential to the invention that no rigid diaphragm is used as known in the prior art but a movable diaphragm portion which can be actuated by suitable actuation means. This allows the opening of the diaphragm to place the limb into the retaining means. It is essential that by the stripping diaphragm the bone can be completely moved through the diaphragm aperture, the diaphragm aperture being enlarged just before the thicker end of the bone reaches diaphragm aperture so that it can pass the aperture unrestrained. With the apparatus according to the invention, the bone is pushed out of the fillet such that no bone chips are split off and only small meat residuals remain at the bone. By this a maximum gain and fine looking meat portions are achieved.

There are different structural solutions to accomodate a limb in retaining means and to retain it such that the bone can be pushed out. An embodiment of the invention provides that on both sides of the diaphragm an abutment is located between which the bone is retained. Driving means generate a relative movement between stripping diaphragm and abutment, preferably the abutments being actuated while the diaphragm aperture is axially stationary. The abutments do not only retain the bone between its ends but also fix it transverse to its axis. Therefore, the bone is axially guided during the relative movement between the abutments and the stripping diaphragm wherein a fair separation of the bone from the meat is obtained.

The bone length of poultry limbs varies to a considerable extent. Therefore, in an embodiment of the invention the distance of the abutments is automatically changeable, e.g. through a displaceable support of one of both abutments. This abutment, however, has to be fixed for the pushing and stripping process. The support, therefore, has to be designed that in each attained position the movable abutment can be fixed.

The patella is located at the knee portions of the upper and lower leg, respectively, corresponding to the prior separation cut between lower and upper limb. Therefore, it is advantageous if the limbs are received in the retaining means such that the knee portion engages the fixed abutment. An automatic separating device, e.g. a saw, thus, can be adjusted in an equal distance from the fixed abutment in order to separate the tendons and the patella from the fillet of the lower or upper leg, respectively.

One abutment is preferably movable. To obtain an axial orientation of the abutment element independent of the length of the bone, an embodiment of the invention provides that the abutment is the coupler of a four-bar joint. The four-bar joint serves for a sufficient approximated straight guidance of the abutment independent of the length of the bone.

In the apparatus according to the invention, preferably both abutments are positioned on a slide or the like which can be displaced along slide ways. The driving means to push out the bone engages the slide and moves it along the slide ways whereby both abutments are contemporily and uniformly moved relative to the stripping diaphragm to push out the bone of the fillet.

It has already been mentioned that the bones of the upper and the lower leg have a bend which is approximately in one plane. Therefore, it is sufficient if the floatingly supported diaphragm can yield along one axis. It is prerequisite in this case to place the limb into the retaining means in correct orientation. This can be carried out manually or automatically. In order to maintain this position also during the stripping process an embodiment of the invention provides that the retaining means include at least a movable retaining spike or the like driven by spike actuating means to engage the end portion of the bone adjacent the knee and to prevent it from rotation. The spike actuating means can be structured more simply if it is coupled with the means to fix the movable abutment. The spike can engage the bone as soon as the abutment has been fixed. For both functions only one driving means are to be provided. A clamping disc for example can be provided to fix the abutment, the clamping disc engaging a clamping point of the abutment in each position thereof in order to fix it at the desired axial position. The clamping disc can be actuated for example by a lever which in turn includes a control surface for the actuation of the retaining spike.

It has already been mentioned that it would be sufficient to move the stripping diaphragm only along one axis. In this connection an embodiment of the invention provides that the stripping diaphragm is supported by the support member which is rotatably supported about an axis approximately parallel to the diaphragm plane. This is the most simple way to achieve a floating support which for the desired purpose is sufficient.

The stripping diaphragm includes at least one movable diaphragm portion; it is understood that the diaphragm aperture can be formed also by plurality of movable diaphragm portions. According to an embodiment of the invention, the movable diaphragm portion is mounted on a pivotally supported lever which is coupled with the diaphragm actuating means. The diaphragm actuation, according to an embodiment of the invention, can include a gear segment connected to the lever, the gear segment camming with a gear rod which is actuated by cam means.

Since the deboning unit appropriately is subjected to a plurality of process steps, it is advantageous to move it from working station to working station, e.g. from a supply station to a bone rejection station and a fillet rejection station. If looking in working direction an automatic skin removing station can be arranged upstream of the first rejection station. The fixing of the limb in the retaining means, the skin removing operation, the cutting operation (knife cut between patella and fillet), and the pushing of the bone out of the fillet then occurs between the supply station and the first rejection station. The actuations described above for the relative movement between abutments and the stripping diaphragm, the fixing of the movable abutment and of the movable diaphragm portion, therefore, preferably are controlled by cam means which are located between the mentioned working stations. Preferably, a series of deboning units are located on a carrousel or a turn table in order to achieve a high production rate. Correspondingly, cam paths can be associated with the carrousel which actuate cam follows on the deboning units to carry out the described function in a timed sequence.

The described embodiment of a deboning apparatus according to invention enables the reproducible retaining of the limbs in the deboning units so that by means of an automatic separating means which is located between the supply station and the first rejection station, the patella and the tendons can be separated from the fillet. According to an embodiment of the invention, the cutting station includes a movably supported driven rotary knife, the axis thereof approximately extending parallel to the bone in the deboning unit, control means moving the knife in a plane such that it is moved around the bone about an angle greater than 180°. It has turned out that the rotary knife can engage the unscratched limb under certain pressure. The bone is scratched when the tendons are cut, however, it is not cut or detoriated. By means of the rotary knife, the patella and the tendons can be effectively automatically separated from the remaining meat without causing undesired bone chips. However, it is understood that according to a further embodiment a depth stop can be provided by which the cutting effect of the rotary knife on the bone is limited in order to exclude a scratching.

In order to achieve an automatic satisfactory rejection of the bone a separate pivotable cam lever can be provided cooperating with a stationary cam path associated with the turn table or carrousel. The discs, e.g. gear segments, connected to the shafts for the fixing elements cooperate with the cam lever so that the fixing element disengage the bone in time prior to arriving at the rejection station so that a rejection is not obstructed.

As already mentioned above the fixing elements can be formed as spikes. Spikes, however, are unsuited to transfer relatively high forces. According to an embodiment of the invention, the fixing elements are shaped as jaws. With this embodiment the bone is positively engaged more or less and prevented from rotation by friction. This engagement suffices to obviate the prevailing forces and to care for a rotation lock. On the other hand, the jaws can be simply removed from the bone, at least more simplier than spikes which penetrate the bone more or less.

As already described, the gear segments can engage each other to secure a synchronous actuation of for example the spikes. Alternatively, according to a further embodiment of the invention, the cam lever is linked to a rod which has two rod gear portions each cooperating with a gear segment. By this an effective coupling between the cam lever and the shafts for the fixing elements is achieved under concurrent synchronization of the shaft rotation. Since the cam lever normally is only effective in one direction, spring means effect in the opposite direction in order to bring the fixing element in or out of engagement with the bone depending from the effective direction of the cam path on the cam lever.

The apparatus according to the invention will be hereinafter explained along an example illustrated by drawings.

Figure 1:
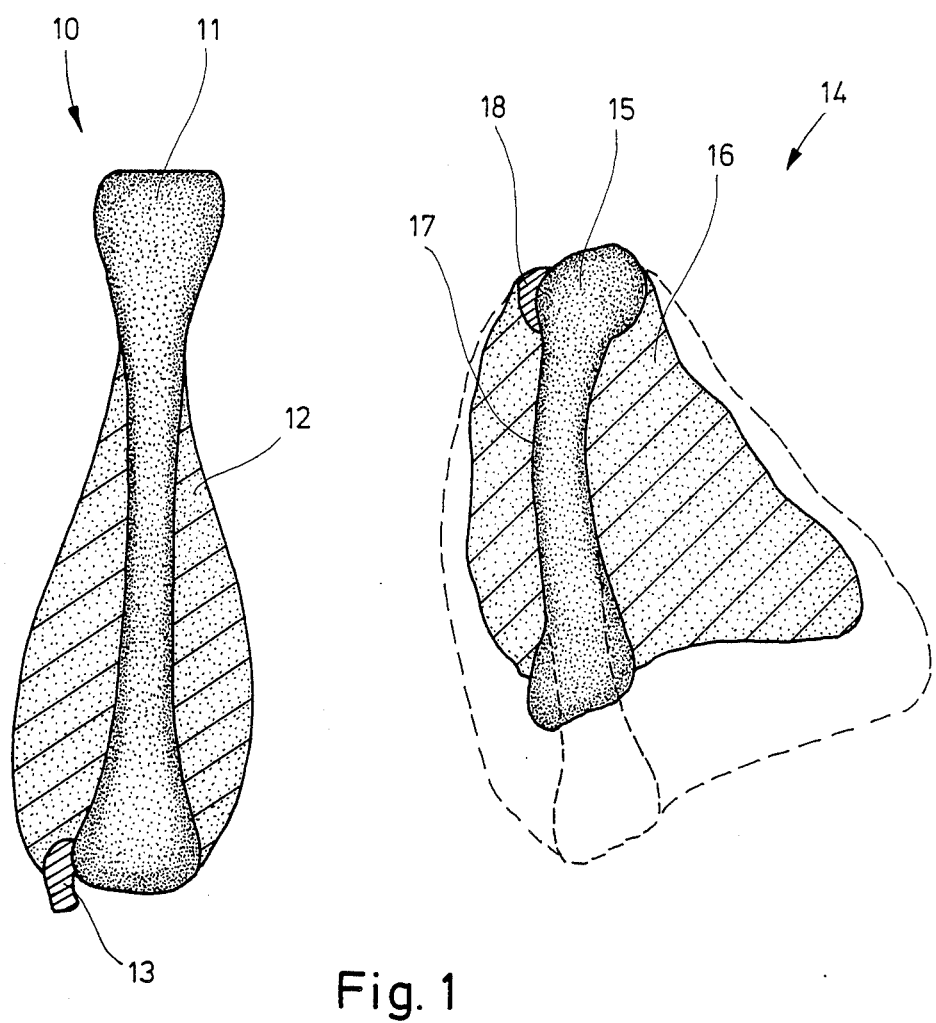
FIG. 1 is a section through the lower or the upper leg of a poultry.
Figure 10:
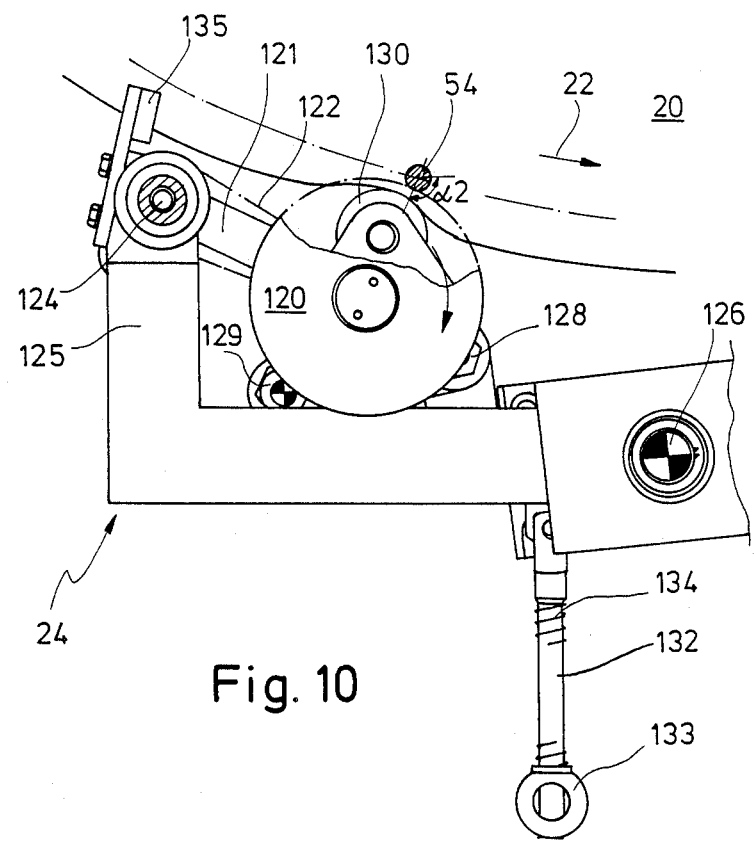
FIG. 10 is a view on the cutting station in a third operational phase.

In FIG. 1 10 designates the lower leg of a poultry turned upside down. It includes a lower leg bone 11 as well as the muscle 12. Further, a portion 13 of a patella is shown which, as is known, is coupled to the muscle 12 through tendons.

14 designates in FIG. 1 an upper leg which is also turned upside down. It includes a bone 14 and the associated fillet 16. It is shown by dotted lines that the upper leg and the associated bone may have different length. At 17 the bend of bone 15 is indicated extending in a plane. The corresponding patella portion is shown at 18.

The following explanations only refer to the processing of the upper leg 14, however, it is clear for the man in the art that this are also valid for the lower leg.

Figure 2:
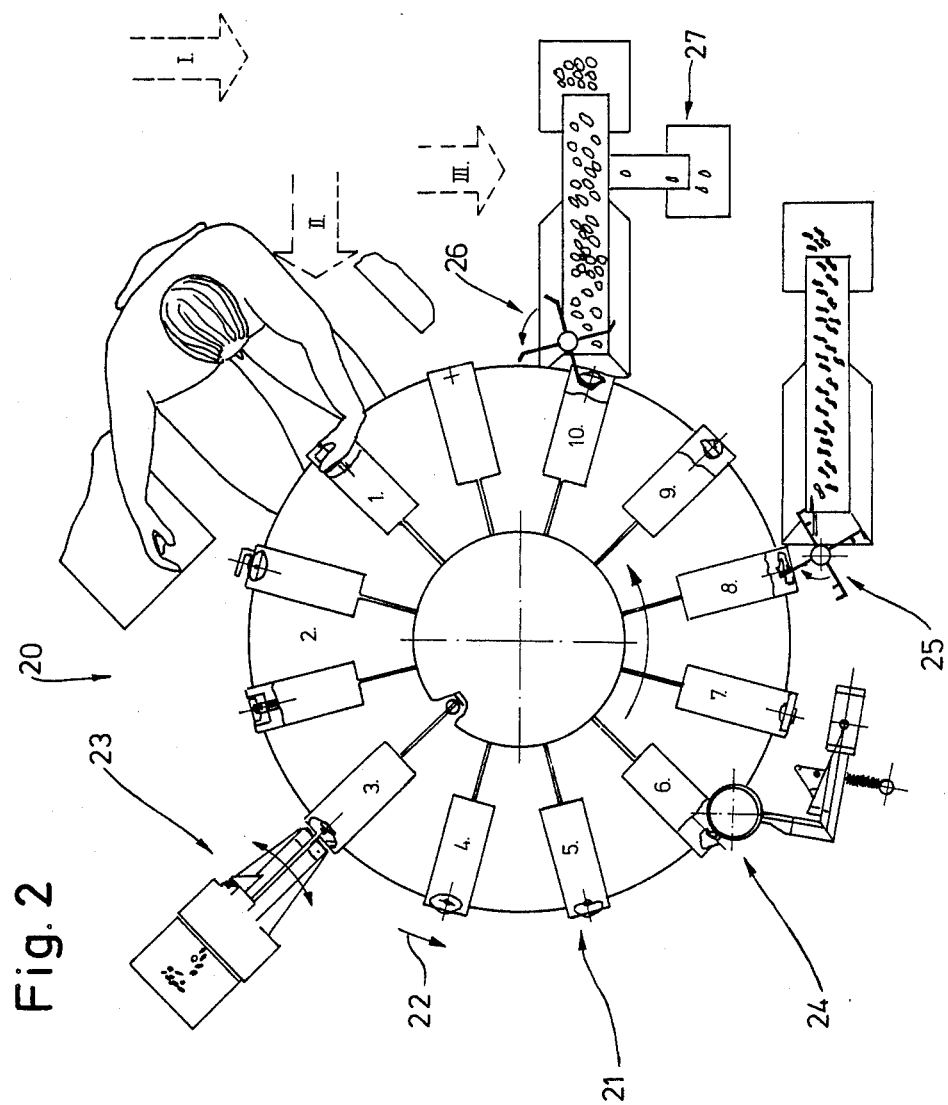
FIG. 2 is a plane view on a diagrammatically illustrated apparatus according to the invention inclusive indivdual deboning units.

In FIG. 2 a turn table 20 is rotatably supported about a vertical axis, the turn table being adapted to be driven continuously or stepwisely, respectively, by driving means not shown. Twelve deboning units 21 can be arranged on the turn table at uniform circumferential distances. The numbers 1 to 10 indicate different working stations, only a portion thereof will be described furtheron. In the working station 1 an operator places upper legs 14 in the deboning units 21. The turn table 20 moves anticlockwise as indicated by arrow 22. In the working station 3 an automatic skin removing device 23 is diagrammatically shown removing the skin from the upper leg 14. Such a device is known per se and will not be described in detail.

An automatic cutting device 24 is located in working station 6 which cuts into the upper leg 14 about a larger angle up to bone 15 below the patella portion 18 (FIG. 1) in order to cut the patella portion and the tendons. This will be described in detail more below. The pushing of bone 14 out of the fillet 16 occurs in working station 7 as will be described more below. In working station 8, the squeezed out bones are rejected by means of a rejection device 25. In the working station 10 the fillets are removed or rejected by means of a rejection device 6. By means of suitable control and selection devices fillets including bone portions can be rejected at 27.

The structure of the deboning units can be seen in the FIGS. 3 to 7. A base plate 30 is clamped on the turn table 20 by clamping device 31 not described in more detail. Columnlike slide ways 32, 33 circular in cross section are located on the base plate 30 in vertical orientation. Two parallel plates 34, 35 each have two extensions 36, 37 and 38, 39, respectively, on the lateral sides provided with through-bores through which the slide ways 32 and 33 extend. The plates 34, 35 in conjunction with the extensions 36 to 39 form a slide which is vertically displaceable.

Figure 3:
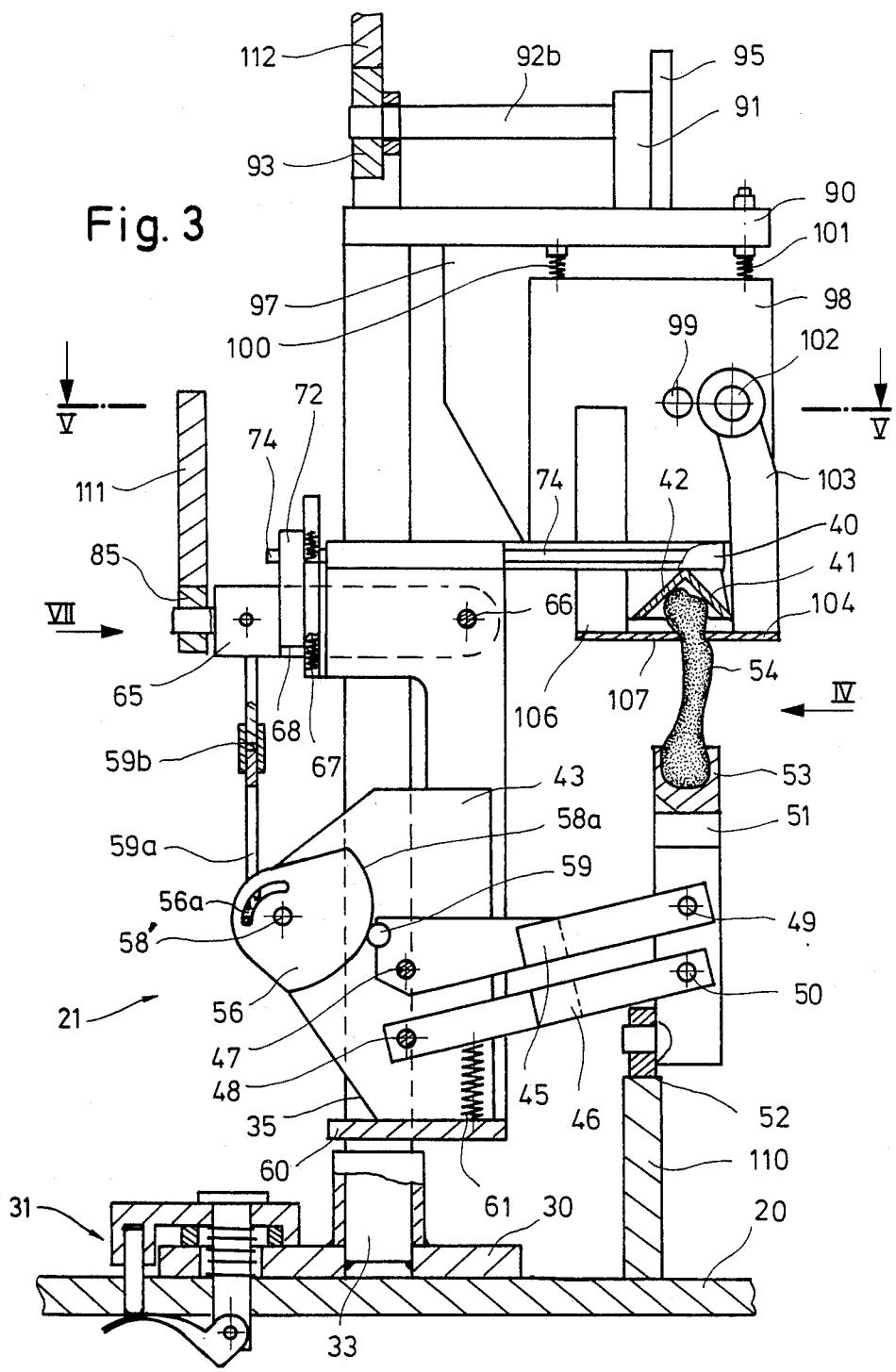
FIG. 3 is a view o the deboning unit of FIG. 1 partially in cross section.

An horizontal arm 40 is located between the upper end of the plates, the arm extending forwardly from a point between slide ways 32, 33. It includes an abutment 41 having a shape of a downwardly facing hollow prism 42 at the lower side of the front end. At the inner side of the plates 34, 35 retaining plates 43, 44 are located projecting rearwardly beyond plates 34, 35. Two pairs of levers forming a four-bar joint. In FIG. 3 the lever arms 45, 46 can be seen which extend parallel and are linked at 47 and 48, respectively. The other ends of the lever arms 45, 46 are linked to a rod-like abutment 51 at 49, 50. The second pair of levers ascending parallel to the first pair of levers is linked to plate 43 correspondingly and with its opposite side is linked to an abutment 51. At the lower end of the squeezing element a cam roll 52 is rotatably supported having a horizontal rotational axis. The squeezing element 41 has a recess 53 at its upper end defined by a series of radial circumferentially spaced chips. It forms a second abutment for a bone 54 which can correspond to bone 15 of FIG. 1.

Two discs 56, 57 are supported on the facing sides of plates 43, 44 for rotation about an horizontal axis. They are commonly fixed onto a shaft 58, and its rotational movement is limited by a arcuate slot 59 into which a pin extends. At the front edge the discs 56, 57 have an arcuate contour as can be seen at 58' in FIG. 3. The discs 56, 57 each are located in a plane of a pair of levers of the already explained four-bar joint. Each of the upper levers 45 of the four-bar joint as a clamping surface 59 cooperating with the arc, 58' of discs 56, 57 in order to fix the four-bar joint in an arbitrary position. A pin 61 is supported by a lower plate 60 interconnecting the slide ways 32, 33, the spring 61 acting against the lever 46 from below and thus on the four-bar joint, thus, also on the squeezing element 51.

At 66 a lever 65 is pivotally supported between plates 34, 35 below the upper arm 40. Springs 67 on opposite sides acting on lever 65 in clock-wise direction. At 68 a rear portion of the lever includes two angularly located control surfaces adapted to be engaged by cam rolls 69, 70 of control levers 71, 72. By springs 67 engaging gear segments 80, 81 the control levers 71, 72 are prerestrained towards each other. The gear segments 80, 81 are mounted on parallel shafts 74, 75 which are rotatably supported laterally of the upper arm 40. The shafts 74, 75 extend forwardly on both sides of the abutment 41. The shafts are bent downwardly at 76 and 77, respectively, in the area of abutment 41. The bent portion 76, 77 is provided with a spike 78 and 79, respectively, which extends through lateral openings of abutment 40 into recess 42. The gear segments 80, 81 are in camming engagement so that the rotations of the shafts 74, 75 are coupled.

At the rear end of lever 65 a cam roll 85 is rotatably supported.

A roof plate 90 is attached to the top of the slide ways 32, 33. Two brackets are mounted on the roof plate 90, one thereof being shown at 91; the bracket rotatably supports a control lever 92, a cam roll 93 being supported at one end thereof; the other rotatably supports a lever arm 92. The rotating points of the levers 92, 92a are located on a common shaft 92b. A spring 94 acts on lever 92a in anti-clockwise direction. The other arm 92 is linked to a gear rod 95 which is guided by a guide means 96 U-shaped in cross section which is attached to the roof plate 90. Adjacent to gear rod 95 a support member 92 is suspended, a support block 98 engaging the support member 92 and is supported for a pivotal movement about a horizontal axis as indicated at 99 relative to support member 97. Springs 100, 101 act on support block 98 securing a neutral position if block 98 temporarily has been pivoted to one or the other side. A lever 103 is rotatably supported by support block 98 at 101. The rotational axis extends parallel to the rotational axis for support block 98. A diaphragm plate 104 is mounted on the free end of lever 103, the plate 104 horizontally extending below abutment 40. The diaphragm plate has an approximately semi-circular opening (not shown) at its free edge. An arm 106 is rigidly connected to support block 98 which in the shown position extends parallel to lever 103. At the free end of lever 103 a diaphragm plate 110 is mounted extending towards diaphragm plate 104 in the same plane. The diaphragm plate 107 has also an approximately semi-circular recess so that upon abutment of both plates 104, 107 approximately a circular opening or aperture is formed.

Figure 5:
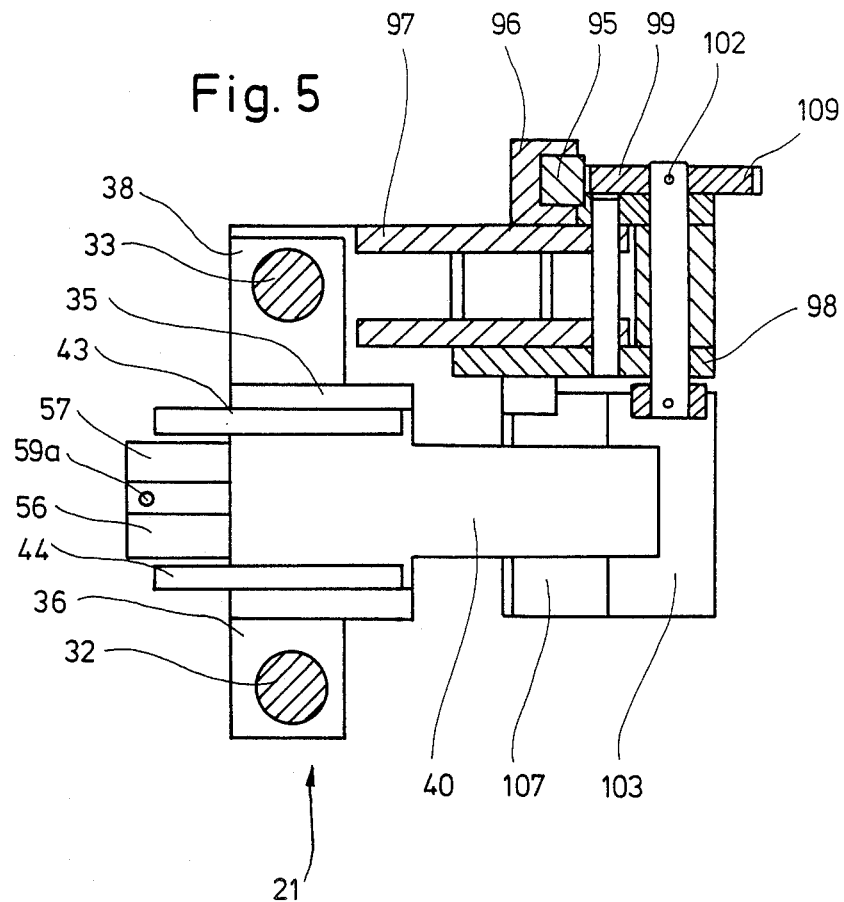
FIG. 5 is a cross section of FIG. 3 along line 5—5.
Figure 6:
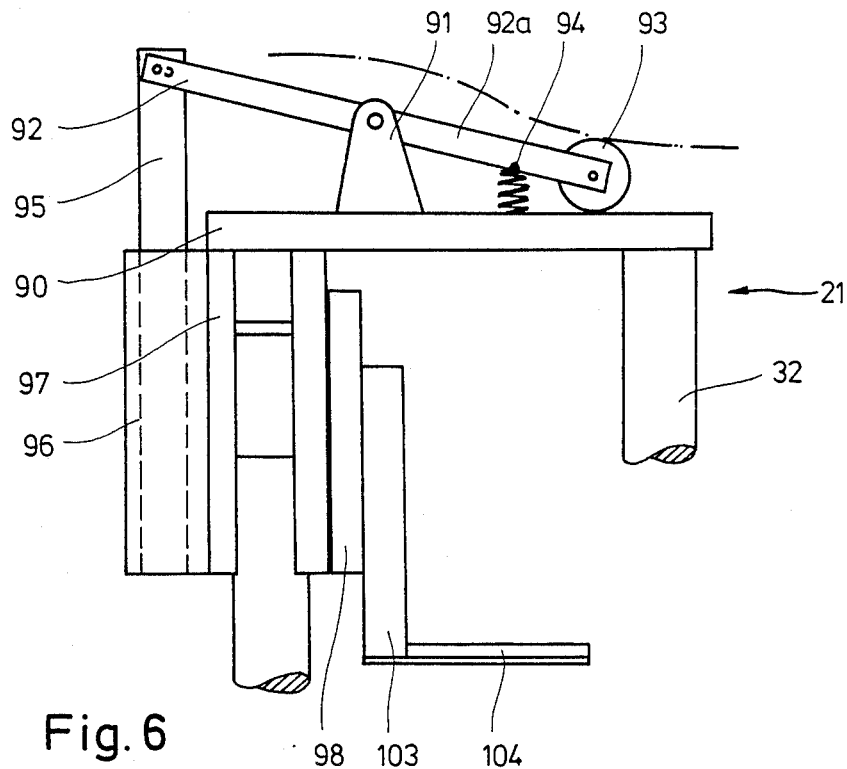
FIG. 6 shows a detail of the deboning unit of FIG. 3.
Figure 7:
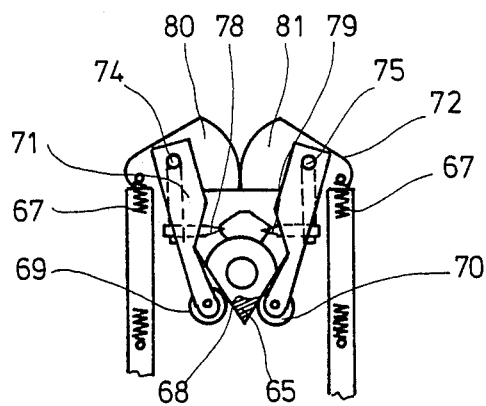
FIG. 7 is a rear view of the deboning unit of FIG. 3 viewed along arrow 7.

As can be seen in FIG. 5 102 designated a supporting shaft extending through support member 97 and support block 98. At the end opposite to lever 103 a gear 109 is arranged on support shaft 102 and engages gear rod 95.

In FIG. 3 three cam paths 110, 11 and 112 can be seen. They are stationarily associated with turn table 20. Cam path 110 serves for the actuation of cam roll 52 and thus for the actuation of squeezing element 51. Cam path 111 serves for the actuation of lever 65 through cam roll 85 against the first of spring 67. Cam path 112 actuates cam roll 93 and thus the gear rod 95 which in turn actuates gear 109 which through shaft 102 pivots lever 103.

The function of the deboning unit shown in the FIGS. 3 to 7 will be explained hereinafter. If deboning unit is in working position 1 (see FIG. 2) the limb is put in place; in FIG. 3 merely bone 54 is illustrated. The bone end adjacent the knee lies in recess 42 of abutment 51 while the bone end adjacent the hip lies in recess 53. Before the limb can be actually placed the operator must move the squeezing element 51 downwardly against spring 160 acting on the fourbar joint. For this it is necessary that the clamping between curve 58 of clamping disc 54 and clamping point 59 is eliminated. Therefore cam path 111 is located in this area which pivots lever 65 against spring 67 in clockwise direction. This movement is transferred to rod 59a by which the clamping discs 56, 57 are rotated anticlockwise to eliminate the clamping effect. It is to be noted that rod 59a can be varied in its length as shown at 59b. Further, spring 94 at lever 92a takes care that gear rod 95 attains its most lower position whereby the diaphragm lever attains its extremely opened position. The operator now can put in place the limb by pressing down the lower abutment 51. By a spring 61 the limb is fixed between the abutments to some extent. It is to be further noted that the limb has to be put in place in a predetermined orientation such that the bone curvature in the embodiment shown approximately extends in the drawing plane of FIG. 3. Just behind the working station 1 the cam path 111 gives way so that the lever 65 is pivoted in clockwise direction by the springs 67 whereby the clamping curve 58 engages the clamping point 59 to fix the four-bar joint 45, 46. By this also the axial position of squeezing element 51 is fixed. In the position of lever 65 previously described the cam levers 71, 72 have been pivoted away from each other so that the tips or spikes 76, 79 of shafts 74, 75 have its most remote position from each other to not obstruct the putting in place of the limb. If lever 65 is pivoted in clockwise direction the cam levers 71, 72 move towards each other synchronously controlled by gear segments 80, 81 so that the spikes 78, 79 can penetrate the bone adjacent the knee to fix it against rotation. The limb, thus, is fixed with respect to the axial direction as well as with respect to the rotational direction for the following treating processes. The cam path 112 takes care that the lever 103 attains the position shown in FIG. 3 so that bone 54 extends through the diaphragm aperture with its upper portion. Subsequently, the deboning unit is moved along the individual working stations by turn table 20, particularly to the skin removing station 23 and the cutting station 24. In the cutting station 24 a larger circumferential cut is carried out below diaphragm plates 104, 107 in order to cut off tendons and the patella portion. The squeezing out of bone 54 takes places between working station 6 and working station 7. This is carried out by a cam path 110, e.g. by an ascending portion which urges the cam roll 52 upwardly. As already mentioned, lower abutment 51, four-bar joint 45, 46, plates 34, 35, lever 65 and upper arm 40 inclusive upper abutment 41 form a unit adapted to be displaced along columns 32, 33, previously this unit being designated as slide. A displacement of lower abutment 51 axially upwardly thus leads to a synchronous displacement of the abutments. Bone 54, therefore, is not under axial pressure between the abutments 41, 51. The diaphragm plates 104, 107, however, are stationary in deboning direction so that they retain the fillet. Due to be pivotal support of support block 98 the diaphragm opening can be moved to a limited extent in a plane lying in the drawing plane in order to follow the curvature of the bone. The width of the diaphragm opening, therefore, can be selected as large as necessary to receive the maximal bone diameter between its ends.

Figure 4:
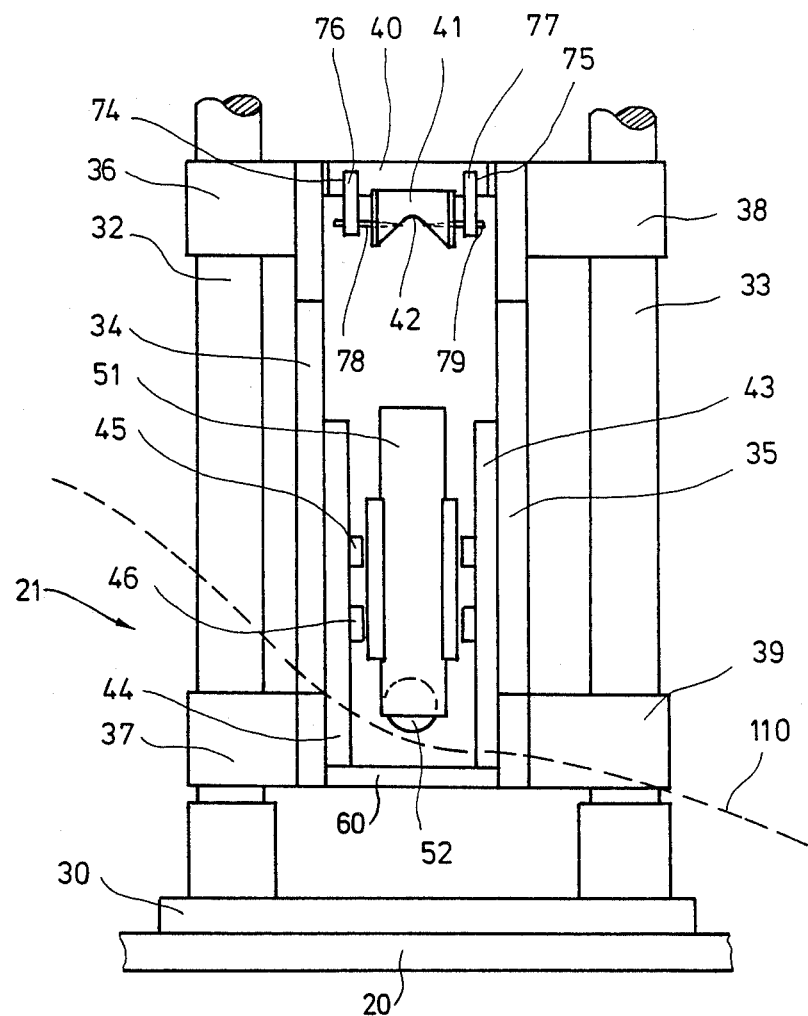
FIG. 4 is an end view of the deboning unit according to FIG. 3 viewed along arrow 4.

If in the manner described the bone 54 largely has been pushed out of the filet, the bone end adjacent the hip approaches the diaphragm plates 104, 107; then a portion of cam path 112 effects on lever 103 to pivot it in anti-clockwise direction (FIG. 3) to an extent which is sufficient that the thicker bone end passes the diaphragm opening. By this the bone 54 can be completely pushed out of the filet. Subsequently, it can be removed in the rejection station 8 in a way already described. For this it is necesarry that the clamping of the four-bar joint is eliminated. A portion of clam path 111 cooperates with cam roll 85 to rotate the clamping discs 56, 57 anticlockwise (FIG. 3) so that abutment 51 may be yield downwardly. Further a portion of cam path 112 takes that lever 103 is rotated anticlockwise (FIG. 3) to its opened position. Prior to this cam path 112 gives way so that by means of the spring not shown the total slide may return in its upper initial position (as shown in FIGS. 3 and 4).

In the FIGS. 8 to 11 the cutting device of a cutting station 24 is shown more detailed. It includes a rotary knife 120 rotatably supported on a pivot arm 121. It is driven by belt 122 which in turn is driven by a roll 123, the roll 123 being driven by driving means not shown. Pivot arm 121 is linked to a rectangular lever 125 for rotation about axis 124. The other arm of lever 125 is stationarily linked at 126 that is about an axis which is parallel to the pivot axis of pivot arm 121. A rocking lever 127 is linked to lever 125 at 128. The working lever 127 is stationarily linked at 129. A cam roll 130 is rotatably supported by rocking lever 127. It cooperates with a cam path 131 at the turn table 20. A rod 132 engages the rectangular lever 125, the rod 132 being axially guided at 133. Rod 132 is loaded by a spring 134 towards lever 125 so that the cam roll 130 engages the cam path 131 under certain pressure. A spiral spring not shown acts on the pivoting area of pivot arm 121 to pivot it in clockwise direction. An abutment 135 at arm 125 limits this movement.

Figure 8:
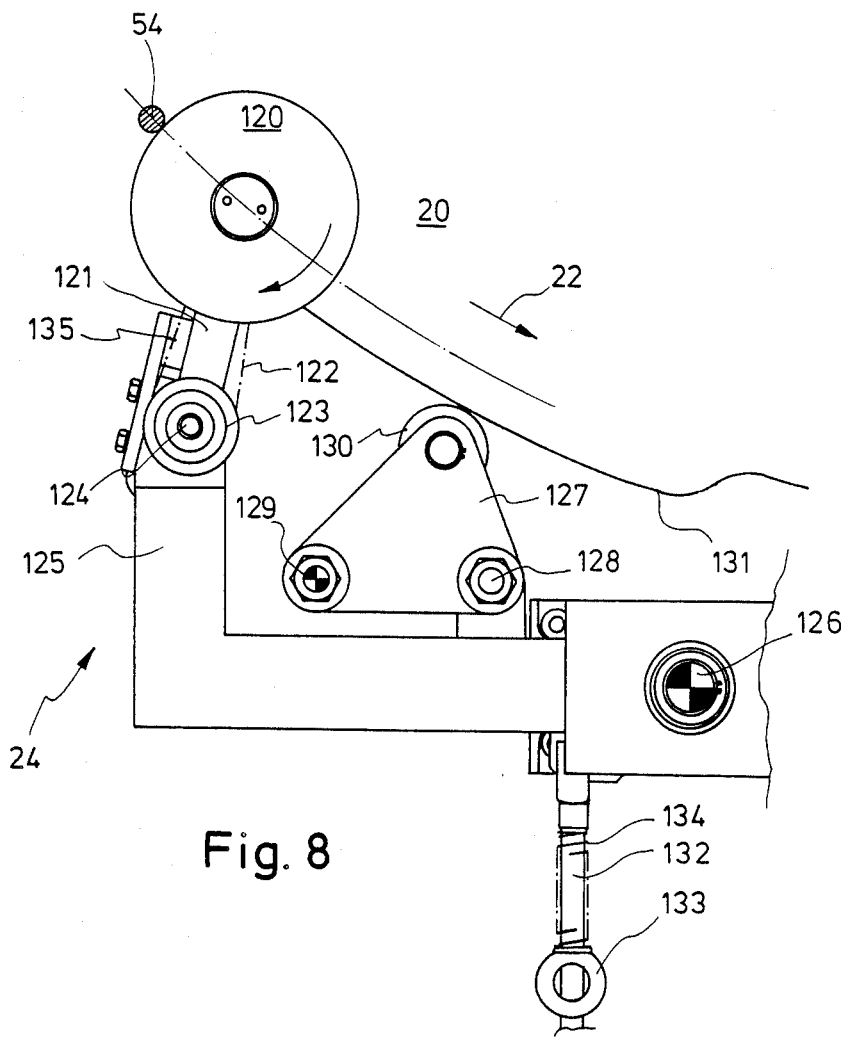
FIG. 8 is an enlarged view on the cutting station of FIG. 2 in a first operational phase.
Figure 9:
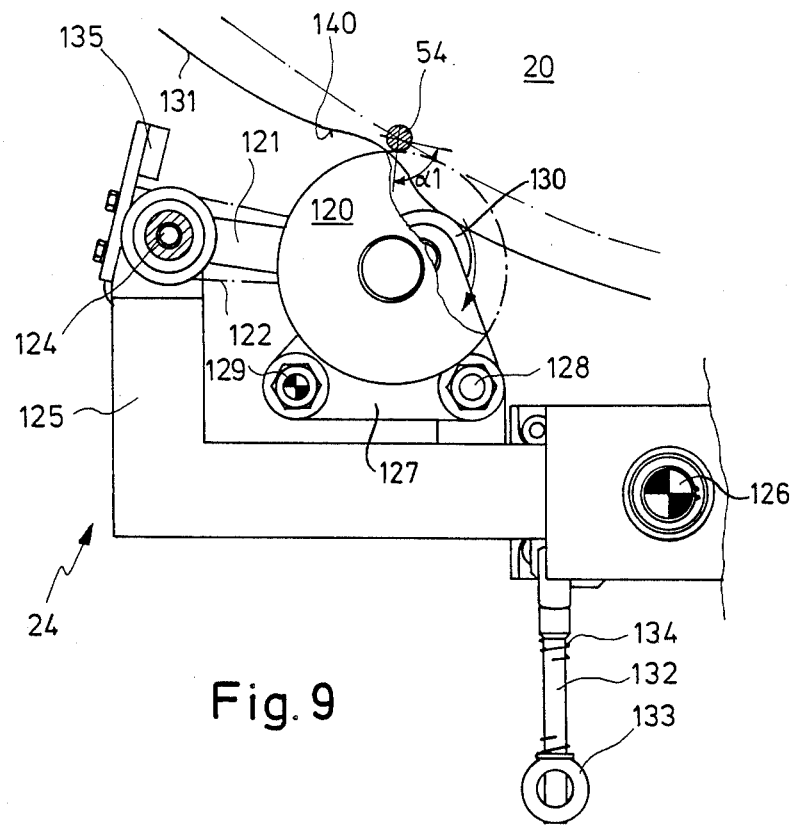
FIG. 9 is a view on the cutting station in a second operational phase.
Figure 11:
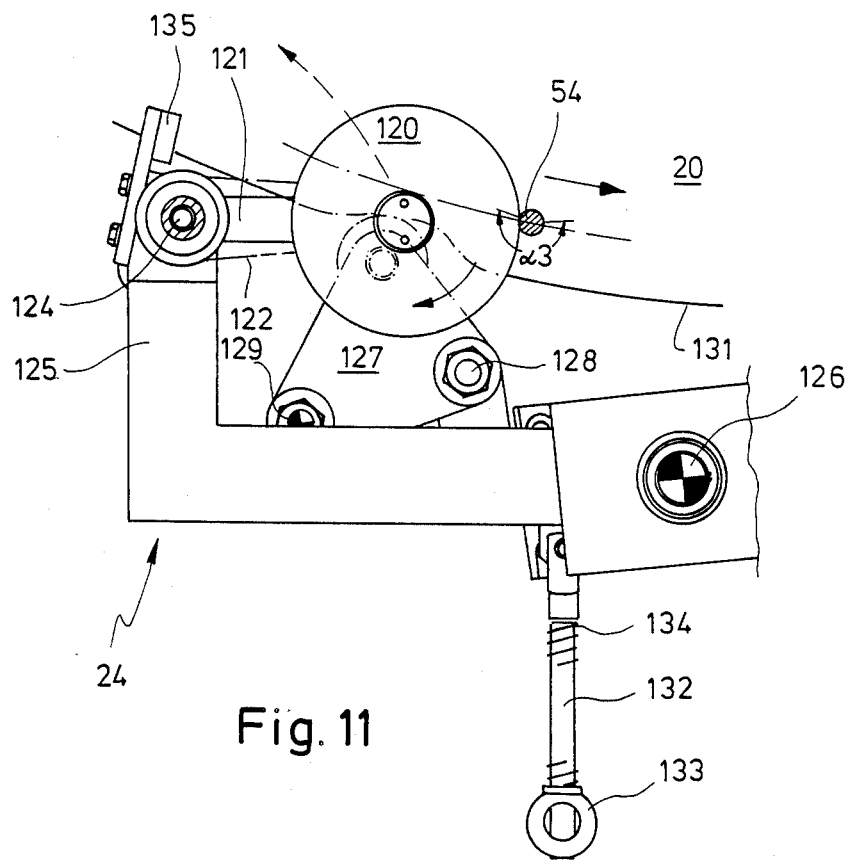
FIG. 11 is a view on the cutting station in a fourth operational phase.

In the following the function of the cutting device is described. FIG. 8 shows an initial phase wherein pivot arm 121 engages abutment 135. A deboning unit approaches rotary knife 120. Only bone 54 is shown in cross section. The rotary knife 120 is driven in clockwise direction and cuts through the meat and the associated tendons during the movement of turn table 20 in anticlockwise direction according to arrow 22. Bone 54 engages the rotary knife 21, and since the spring load on pivot arm 121 is relatively weak this is pivoted in clockwise direction about an angle of approximately 90° as shown in FIG. 9. Thereby the engaging point of rotary knife 120 passes around bone 54 about an angle of α1 of about 90°. Meanwhile a depression 140 of the cam path 131 approaches into which a cam roll 130 immerses. By this working lever 127 pivots in anticlockwise direction and lever 125 rotates in clockwise direction, with the pivot arm 121 and thus the rotary knife 120 moving further in clockwise direction. The engaging point of the rotary knife 120 with bone 54 travels a further angle α2 which now amounts to approximately 120°. Upon progressive movement of turn table 20 cam roll 130 slowly leaves depression 140 as can be seen in FIG. 11. The working lever 127 is pivoted in clockwise direction and lever 125 also in clockwise direction so that the pivot arm 121 can return in anticlockwise direction and approach concurrently bone 54. This results in a further travel of engaging point with bone 54 so that the total angle α3 travelled by the engaging point is approximately 180°. This angle suffices to cut all tendons and the patella portion.

Figure 12:
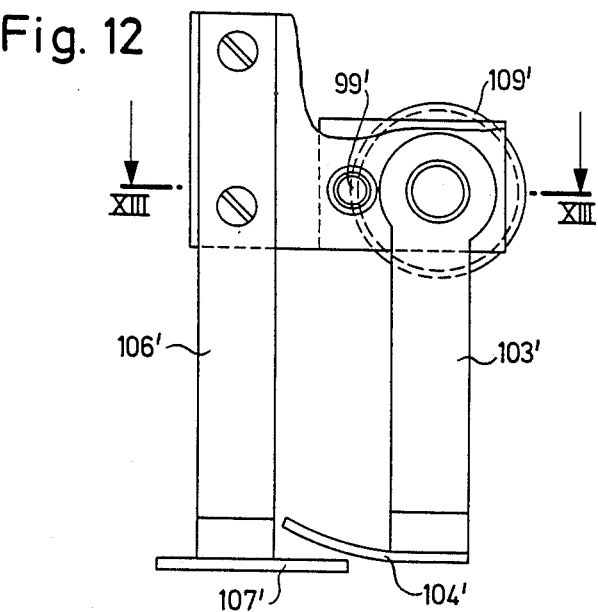
FIG. 12 is a lateral view on the stripping diaphragm for the deboning unit of FIG. 3.
Figure 13:
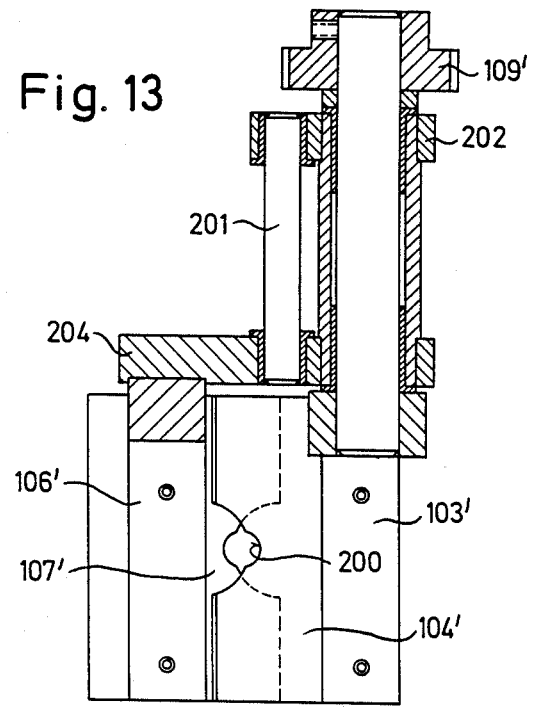
FIG. 13 is a cross section through FIG. 12 along line 13—13.
Figure 14:
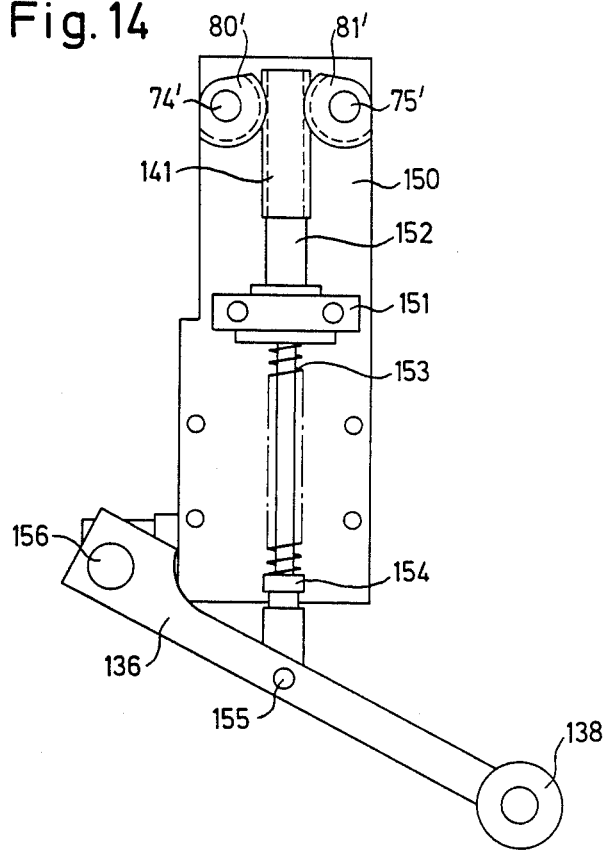
FIG. 14 is a rear view of a part of the deboning unit of FIG. 13 with a modification.
Figure 15:
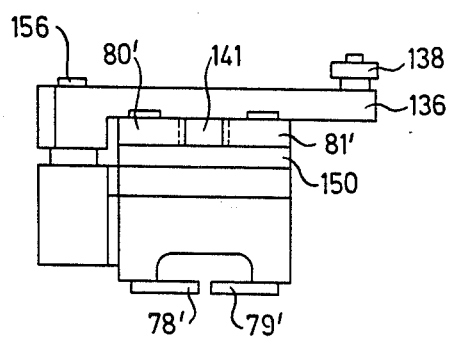
FIG. 15 is a plane view on the detail of FIG. 14.

In FIGS. 14 and 15 a modified embodiment for the actuation of the spikes or other fixing elements, respectively, is shown. This embodiment is to be described in the following. At the rear side of the slide described above a mounting plate 150 is attached instead of lever 65. It supports shafts 74', 75' which correspond to shafts 74', 75' of the above described Figures, the shafts 74', 75' holding jawlike elements 78', 79' at the forward ends which cooperate with the end of bone 54 adjacent the knee to prevent it against rotation. Gear segments 80', 81', sitting on the shaft 74', 75'. A rod 152 is slidably guided by support member 151 mounted on mounting plate 150, the rod 152 has two gear rod portions 140 at its upper end which cooperate with the gear segments 80', 81'. Below support member 151 rod 152 is surrounded by a spring 153 which abuts against flange 154 on rod 140. The rod 140 is linked to a cam lever 136 at 154, the cam lever 136 being linked to mounting plate 150 at 156, a cam roll 138 being rotatably supported by the opposite end of lever 136. The cam roll coacts with a cam path not shown associated with turn table 20. As long as the cam roll 138 engages the not shown cam path the jaw like fixing elements 78', 79' engage the bone and prevent its rotation during the stripping-off process. Just before the rejection station 25 (FIG. 1) the cam roll 138 disengages the cam path so that spring 153 rotates the gear segments 80, 80', such that the fixing elements 78', 79' disengage the bone. The bone now can be automatically rejected. In the FIGS. 12 and 13 a slightly modified embodiment for the the stripping diaphragm is illustrated. Parts which are equal with that of the above Figures are designated with the same reference numbers which are added by a hyphen. It can be seen that a movable diaphragm portion 104', is overlapping the stationary diaphragm portion 107', the movable diaphragm portion 104' being slightly upwardly bent (FIG. 12). In FIG. 13, the diaphragm portions 104' and 107' are completely closed so that a relatively small approximately circular stripping opening aperture 200 yields. The circular recesses in the diaphragm portions 107' and 104' which form the stripping aperture 200 enlarge to the free edge of the diaphragm portion 104' and 107', respectively, the enlargement being also circular, however, having a larger radius. This radius is dimensioned such that upon travelling of the diaphragm portions 107', 104' away from each other a circular opening of sufficient diameter is formed for the passing of the lower or rear bone end, the circular opening on the other hand having only a slight distance from the bone in order to satisfactorily finish the stripping process. Such a shape for the stripping opening enables a complete surrounding of the bone. If such described overlapping is not provided, a gap occurs between the diagraphm portions upon the opening of the movable diaphragm portion 104' which affects the satisfactory stripping process.

The rocking support of support block 98 about axis 99 (see FIG. 3) takes places by means of pin 201 (FIGS. 12 and 13) which is sitting in the stationary plate 202. On the other hand it is rotatably supported by plate 204 which retains the stationary diaphragm portion 106' and 107', respectively.

It is to be noted that the bone 54 is not merely pushed through the fillet restrained by the diaphragm, however, also drawn by the fixing elements, so that the bone is not exclusively subjected to pressure forces. This although in the description above a squeezing process and a squeezing element is mentioned.

We claim:

1. An apparatus for removing a meat fillet from a bone of a poultry limb having at least one deboning unit, the deboning unit comprising:
   retaining means for retaining the limb;
   stripping diaphragm means for stripping the bone from the fillet including an aperture having a changeable area during the stripping process;
   abutment means for engaging said bone and pushing it through the fillet and out of said fillet;
   driving means to move said stripping diaphragm means and said abutment means relative to each other; and
   wherein said aperture of said stripping diaphragm means has a diameter slightly larger than that of said bone, said stripping diaphragm being formed by two diaphragm plates non-movable in a deboning direction, one of said diaphragm plates being part of a movably supported diaphragm portion adapted to be actuated by a diaphragm actuating means in order to open said diaphragm and to change the area of said diaphragm aperture, said diaphragm plates being movable in unison to a limited extent in the plane of said diaphragm to follow curved portion of said bone.

2. The apparatus according to claim 1 wherein said retaining means includes abutments disposed on both sides of said diaphragm means, both abutments being connected to driving means for driving the abutment relative to said diaphragm, the abutment each including a squeezing element being adapted to change its distance from the other abutment, however, can be fixed at an arbitrary adjusted distance.

3. The apparatus according to claim 2 wherein said abutment is a coupler of a four-bar joint linked to the driving means.

4. The apparatus according to claim 2 wherein said abutments are mounted on a slide which is displaceably supported for movement along a side way.

5. The apparatus according to claim 1 wherein said retaining means includes at least one moveable retaining spike actuable by a spike actuation means which cooperates with the end of the bone adjacent the knee to prevent the bone from rotating.

6. The apparatus according to claim 5 wherein said spike actuation is coupled with clamping means to fix said moveable abutment such that the spike engages the bone when said abutment is fixed.

7. The apparatus according to claim 6 wherein a clamping disc for the fixing of said abutment is coupled with a pivotally supported lever actuated by said spike actuation means, said lever including a control surface for the actuation of said spike.

8. The apparatus according to claim 1 wherein said stripping diaphragm is supported by a support block which in turn is rotatably supported about an axis approximately parallel to said diaphragm plane.

9. The apparatus according to claim 1 wherein a movable diaphragm portion is mounted on a lever rotatably supported and linked to said diaphragm driving means.

10. The apparatus according to claim 9 wherein said lever is coupled to a gear which coacts with a gear rod, and said gear rod being actuable by a cam through a linkage.

11. The apparatus according to claim 4 wherein said slide is adapted to be actuated by cam means.

12. The apparatus according to claim 1 wherein said diaphragm driving means enlarges the area of said diaphragm aperture slightly when said abutment travels a predetermined path.

13. The apparatus according to claim 1 wherein a plurality of deboning units are located on a turn table rotatably driven by driving means and a supply station, a bone rejection station and a fillet rejection station being associated with said turn table.

14. The apparatus according to claim 13 wherein cam paths associated with said turn table to fix said movable abutment and/or to actuate said movable diaphragm portion and/or to drive said stripping diaphragm or said squeezing element.

15. The apparatus according to claim 13 wherein a cutting station is associated with said turn table wherein the tendons and the patella are cut in a limb received by said deboning unit.

16. The apparatus according to claim 15 wherein said cutting station includes a rotatably supported driven rotary knife, the axis thereof approximately extending parallel to a bone in said deboning unit, said rotary knife being movable in its plane by a control device such that it travels about an angle $\alpha 3$ around each bone.

17. The apparatus according to claim 16 wherein said rotary knife is supported on an arm which biases said aid rotary knife towards said deboning unit by spring means, said arm being linked to a pivot lever which cooperates with a further cam path.

18. The apparatus according to claim 17 wherein a control rocking lever is linked to said pivot arm, said rocking lever including a cam follower and is rotatably supported about a stationary axis.

19. The apparatus according to claim 13 wherein a de-skinning station is arranged in front of said cutting station.

20. The apparatus according to claim 1 wherein a separate pivotally supported cam lever is provided cooperating with a stationary cam path associated with said turn table and is coupled to said discs, such that in the one position of said cam lever the fixing elements are in an engaging position and in the other position of said cam lever are in a rest position.

21. The apparatus according to claim 20 wherein the fixing elements are structured as jaws.

22. The apparatus according to claim 20 wherein a rod is linked to said cam lever and has two gear rod portions each cooperating with a gear segment.

23. The apparatus according to claim 20 wherein a spring is acting on said cam lever and thus on said gear segments that either the fixing elements are biased towards its rest or towards its engaging position.

24. The apparatus according to claim 12 wherein said plates forming said diaphragm aperture overlap in its operational position and form a first approximately circular stripping aperture and in a second working position, wherein the plates approximately are abutting form a second approximately circular stripping aperture.

* * * * *

UNITED STATES PATENT AND TRADEMARK OFFICE
CERTIFICATE OF CORRECTION

PATENT NO.   : 4,882,810

DATED        : November 28, 1989

INVENTOR(S)  : Rudiger Ostholt et al.

It is certified that error appears in the above-identified patent and that said Letters Patent is hereby corrected as shown below:

On the title page:

In the References Cited Section, under U.S. PATENT DOCUMENTS, list the following:

US  4,488,332     12/1984     Atteck, et al...........17/46

Signed and Sealed this

Twentieth Day of November, 1990

*Attest:*

*Attesting Officer*

HARRY F. MANBECK, JR.

*Commissioner of Patents and Trademarks*